United States Patent
Torosian

[11] 3,731,154
[45] May 1, 1973

[54] SURGE ARRESTER, PREDOMINANTLY FOR POWER TRANSMISSION LINES

[76] Inventor: Argist Saakovich Torosian, Leningradskaya ulitsa, 8, kv. 10, Erevan, U.S.S.R.

[22] Filed: Nov. 12, 1971

[21] Appl. No.: 198,307

[52] U.S. Cl....................................................317/70
[51] Int. Cl...................................................H02h 9/06
[58] Field of Search...........................317/69, 70, 61; 337/29; 315/36; 338/21

[56] References Cited

UNITED STATES PATENTS

| | | | |
|---|---|---|---|
| 3,515,934 | 6/1970 | Kershaw | 315/36 |
| 3,513,354 | 5/1970 | Sakshaug | 317/69 |
| 3,348,100 | 10/1967 | Kresge | 317/70 |

*Primary Examiner*—William M. Shoops, Jr.
*Assistant Examiner*—Harvey Fendelman
*Attorney*—Eric H. Waters et al.

[57] ABSTRACT

The present invention relates to surge arresters for power transmission lines, characterized in that their auxiliary circuits incorporate stabilizing means, such as Zener or avalanche diodes connected in series with firing means provided in the same circuit.

4 Claims, 5 Drawing Figures

SURGE ARRESTER, PREDOMINANTLY FOR POWER TRANSMISSION LINES

The present invention relates to the protection of electric power plants against voltage surges, and more specifically to surge arresters for power transmission lines, and may be used to protect both the converter units of d.c. power transmission lines and the distribution units of a.c. power transmission lines, where it is essential to have stabilized protective gaps with a low ratio of the breakdown to the operating voltage.

Known in the prior-art are surge arresters for power transmission lines, comprising a main circuit formed by series-connected power gaps and an auxiliary circuit connected to the main circuit via resistors, and consisting of a parallel combination of a linear resistor and a spark-gap also connected in parallel with one of said power gaps (see, for example, the journal "ELEKTRICHESTVO", No. 1, 1962, pp. 55–57, USSR).

However, these prior-art arresters are often subject to false operations under adverse weather conditions on otherwise normally functioning (say, d.c.) power transmission lines, owing to a non-uniform voltage distribution between the arrester elements. Cases have also been noted when frequent breakdown resulted in the destruction of such arresters. This may occur either in the case of a false operation of one of the arrester elements or during extremely short surge peaks, when only one element breaks down while the remaining elements have no time to follow it. As a result, the current through the shunting resistors exceeds the safe limit, and this leads to the destruction of the arrester after some time.

It is an object of the present invention to avoid the above-mentioned disadvantages.

The invention aims at providing a surge arrester for, say, power transmission lines, which ensures a flatter distribution of voltage between its elements under normal operating conditions, a reduced spread in the breakdown voltage, removal of voltage from across the firing gap under normal operating conditions, and self-quenching action on short-duration surges.

With this object in view, the invention resides in that in the arrester disclosed herein, which is a combination of elements, containing a main circuit formed by series-connected power gaps and an auxiliary circuit connected to the main circuit via resistors, and comprising firing means made up of a parallel combination of a resistor and a spark-gap, also connected in parallel with one of said power gaps, the auxiliary circuit containing, according to the invention, stabilizing means connected in series with said firing means.

These stabilizing means may be symmetrical Zener or avalanche diodes, or unsymmetrical Zener avalanche diodes connected in opposition.

An arrester built in accordance with the present invention successfully achieves the above-formulated objective.

The invention will be more fully understood from the following description of a preferred embodiment when read in connection with the accompanying drawings wherein.

Figure 4A:
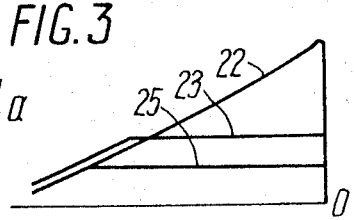

FIG. 4a and b are oscillograms of voltages at the junctions of an arrester relative to earth.

Figure 1:
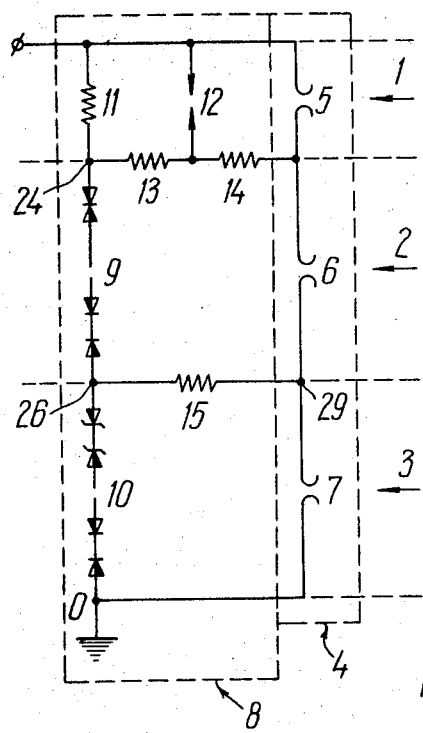
FIG. 1 is a circuit schematic diagram of an arrester according to the invention.

Referring to FIG. 1, there is a surge arrester assembled of three elements 1, 2 and 3. The number of elements in an arrester may be any other, according to the operating voltage of the arrester and the ratio of the breakdown to the operating voltage.

A main circuit 4 of the arrester, according to the number of elements used, consists of three power gaps 5, 6 and 7, connected in series. The power gaps 5, 6 and 7 may be enclosed or exposed. According to the expected short-circuit current, use may be made of simple gaps and of gaps with a rotating arc. An auxiliary circuit 8 consists of heterogenous elements. In the elements 2 and 3, the auxiliary circuit according to the invention consists of series-connected symmetrical semiconductor stabilizing devices 9 and 10, which may be symmetrical Zener or avalanche diodes, or unsymmetrical Zener and avalanche diodes connected in opposition, while in the element 1 the auxiliary circuit 8 consists of a linear resistor 11 and a spark gap 12 which are interconnected through a resistor 13 at the junction between the elements 1 and 2. The spark gap 12 is similar in construction to, say, the spark gaps of valve arresters, that is, it has a stable breakdown voltage and is hermetically sealed.

The auxiliary circuit 8 and the main circuit 4 of the arrester are interconnected through linear resistors 13, 14, and 15, such that the resistance $R_{11}$ of the resistor 11 is much higher than the resistance of each of the resistors 13, 14, or 15 (that is, $R_{13}$, $R_{14}$, or $R_{15}$). The number of series-connected stabilizer diodes is chosen such that $nV_1 = 1.05$ to $1.1 V_2$ where $V_2$ is the highest operating voltage of the plant protected by the arrester, $V_1$ is the stabilization voltage of a single symmetrical semiconductor stabilizing dtvice 9 or 10, and n is the number of single semiconductor stabilizing devices in an arrester.

Figure 2:
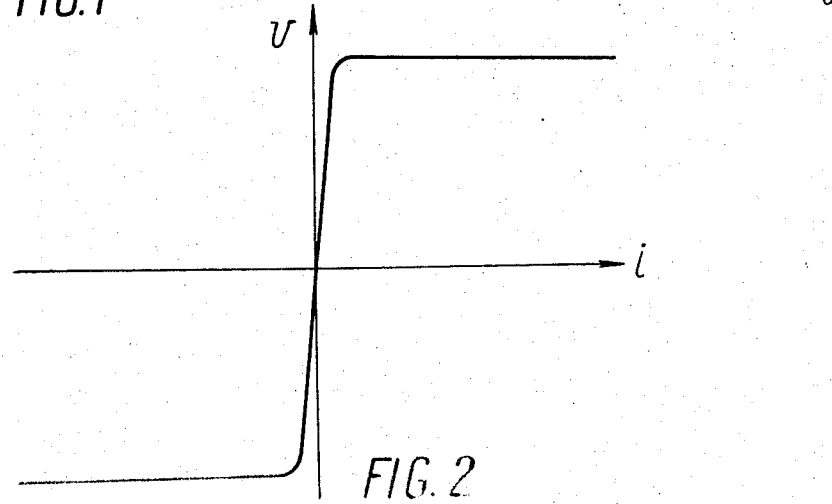
FIG. 2 shows in a graph the V/I characteristic of a symmetrical crystal stabilizer diode.

In the graph of FIG. 2, the current through the semiconductor device 9 or 10 is plotted as the abscissa, and the voltage across that device is plotted as the ordinate.

In cases where the ratio of the breakdown to the operating voltage of the arrester is greater than 2-to-1, the resistor 11 may be replaced with two resistors 16 and 17 (FIG. 3) connected in series, while the spark gap 12 may be connected across the resistor 16 alone. In this case, the main circuit in the element 1 will also contain two series-connected power gaps 18 and 19 connected to the auxiliary circuit via resistors 20 and 21.

Figure 4B:
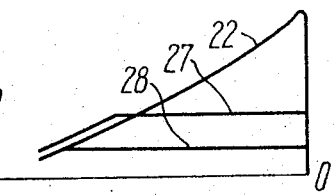

The curves 22 in FIGS. 4a and 4b represent the voltage across the arrestor, the curve 23 represents the voltage across the stabilizing devices 9 and 10 at point 24 (FIG. 1), the curve 25 represents the voltage across the stabilizing device 10 at point 26 (FIG. 1); the curve 27 represents the voltage between the earth and the lowest potential of the firing gap, and also the voltage across the main gaps 7 and 8, and the curve 28 represents the voltage across the main gap 7.

These voltages hold for the instant preceding the operation (breakdown) of the arrester.

Under normal operating conditions, the voltage $V_2$ across the arrester is lower than the stabilization voltage $V_1$ of the semiconductor devices 9 and 10, because of which the voltage is partitioned between the elements 2 and 3 owing to the greater internal resistance of the semiconductor devices 9 and 10 in comparison with that of the resistor 11.

The distance between the electrodes in the gaps 6 and 7 is chosen such that they will not break down under normal operating condition in any weather if they are made exposed. When they are made enclosed, the leakage path lengths of the insulators should be properly selected. The average breakdown voltage for the gaps 6 and 5 when made exposed may be 1.6 to 1.8 times as great as the operating voltage across the respective elements, while for the enclosed gaps it should be 1.2 to 1.4 times the operating voltage.

Under normal operating conditions, the voltage across the element 1 is zero. As a consequence, the voltage across the gaps 12 and 5 is also zero.

Under unfavourable weather conditions (rain, snow, sleet, etc.) and especially when the damp surfaces on the porcelain covers of the elements 2 and 3 are drying, the leakage resistance on the surfaces of these elements may be different, so that the voltages across these elements will likewise tend to be distributed non-uniformly. This will be prevented by the stabilizing networks, the voltage across which cannot markedly rise above the stabilization voltage, that is, $nV_1 = 1.05$ to $1.1\ V_2$. The stabilizing network of the element across which the voltage tends to rise will pass the leakage current, thereby maintaining a constant voltage distribution between the elements with an accuracy of 5 to 10 per cent.

It should be noted that a portion of the working voltage will also be dropped across the resistor 11 due to the leakage current.

The nominal currents of the stabilizing networks should be greater than the long-time leakage currents over the porcelain surfaces of the elements. Since the voltage distribution is usually non-uniform when the porcelain surfaces of the arrester elements are drying, that is, when the leakage currents are small, the requirements formulated above are most stringent. Therefore, under normal operating conditions there is always a constant voltage across the elements 2 and 3 and, as a consequence, across the gaps 6 and 7, so that with a sufficiently wide margin for the breakdown voltage, false operations of the gaps 6 and 7 are avoided.

When a surge reaches the arrester, a current begins to flow in the circuit consisting of the resistor 11 and the stabilizing devices 9 and 10, given by $i = (V - nV_1)/R_{11}$, where $V$ is the voltage across the arrester and $nV_1$ is the total stabilization voltage across the stabilizing devices 9 and 10.

As the voltage across the arrester rises, the voltage across the stabilizing devices 9 and 10 remains unchanged. There is practically no rise in the voltage across the power gaps 6 and 7 either, because they are likewise connected to the auxiliary circuit via the resistors 13, 14 and 15 of a relatively low value, while the capacitors in the gaps 6 and 7 are small, being of the order of a few tens of picofarads.

The difference in voltage $V - nV_1 = iR_{11}$ will be dropped across the element 1.

This will happen in the case of all surges whose level is below the breakdown voltage of the arrester.

When the current reaches a certain value $i_1$, the voltage across the element 1 will rise to the breakdown voltage $V_{12}$ of the gap 12. Let the voltage across the arrester correspond to the current $i_1$ be $V_o$ such that $V_o = nV_1 + V_{12} = nV_1 + i_1 R_{11}$ where $V_o$ and $nV_1$ are in accordance with the specifications for the arrester, and the magnitude of $i_1$ is decided by the resistance of the resistor 11. If the resistance of the resistor 11 is too high, a portion of the working voltage will be dropped across the element 1 under normal operating conditions due to the leakage current. However, this is not dangerous.

If the resistance of the resistor 11 is too low, the stabilizer diode chains and the resistor 11 itself will be subject to frequent overloads. Therefore, the resistance of the resistor 11 should be chosen from the condition such that $VR_{11} = R_{11} i_{leak} = 0.1$ to $0.2 V_2$ where $i_{leak}$ is the maximum long-time leakage current.

At time $t_1$, when the voltage across the arrester is $V_o$, the gap 12 breaks down, and a current begin to flow through the resistors 13 and the stabilizing devices 9 and 10, given by $i_2 = (V_o - nV_1)/R_{13}$ and the total current through the stabilizing devices 9 and 10 will be $I(t_1) = i_1 + i_2$ The whole of the voltage difference $V_o - nV_1$ will be dropped across $R_{13}$, and the voltage across the gap 6 will rise to $V_6(t_1) = V_o - nV_1/2$ This voltage will cause the gap 6 to break down at time $t_2$.

If, during the time interval $t_2 - t_1$, the voltage across the arrester decreases and the gap 6 does not break down, the subsequent decrease in voltage to $V_2$ will cause the current through the resistors 11 and 13 to fall to zero (actually to a few fractions of a milliampere), the arc in the gap 12 will go out, and the arrester will be restored to its normal state.

It should be stressed that the voltage across the arrester may also decrease if the current $i_2$, which is chosen from the considerations of the capacity of the stabilizing devices, is too high.

If the gap 6 breaks down at time $t_2$, the voltage at point 29 will rise to $V_{29}(t_2) = nV_1/2 + R_{15} i_3$ where $i_3$ is the current at the instant when the gap breaks down, that is $i_3 = (V_o - nV_1/2) / (R_{14} + R_{15})$ If $R_{14} << R_{15}$, practically all voltage will be dropped across the gap 7, and it will break down at time $t_3$.

Failure of the gap 7 to break down is practically eliminated, because the voltage across it is very high.

After the gap 7 has broken down, the whole of the voltage will be applied across the resistor 14 and, as a consequence, across the gap 5, whose break-down at time $t_4$ will short out the protected plant, and this will complete an operating cycle of the arrester.

The resistances of the resistors 13, 14 and 15 should be specified from the following considerations: if they are too high, this may impair the volt-second characteristic of the arrester because of the delay in charging the stray capacitances of the arrester; if they are too low, the stabilizing networks will be overloaded. State-of-the-art stabilizing devices (Zener and avalanche diodes) can pass a long-time current of a few tens to several hundred milliamperes, and short-time currents (during tens or hundreds of microseconds) up to several hundred amperes.

In selecting resistances for the resistors 13, 14, and 15, it will be well advised to take $i_2$ equal to 5 to 20 amperes and $i_3$, to 20 to 100 amperes.

In addition to a clear-cut distribution of the total voltage across the arrester elements and the restoration of the arrester to normal condition after its partial breakdown (the breakdown of the gap 12), stabilizer-diode networks also minimize the spread in the breakdown voltage of the arrester.

The absolute variances of the breakdown voltage of the arrester and the spark-gap 12 are numerically equal, because the nonlinearity coefficient, $\alpha$, of the stabilizing networks is practically equal to zero, and that of the resistor 11 is unity.

The percent variance of the breakdown voltage is $\sigma_{V_0}\% = \sigma_{V_{12}}\% (V_o - nV_1/V_o)$ where $\sigma_{V_0}$ and $\sigma_{V_{12}}$ are the percent variances of the brek-down voltage of the arrester and the gap 12, respectively.

In some cases, the protective equipment of d.c. converter installations should operate when the actual voltage exceeds the operating voltage of the installation by 35 to 40 percent. Provision of firing gaps that would meet this requirement in the prior-art arresters with uniform shunting entails certain difficulties due to the necessity to prevent corona discharge, to minimize the spread in the breakdown voltage, etc.

In the arrester disclosed herein, there is no voltage across the firing element under normal operating conditions, which fact makes less stringent the requirements that a firing gap is to meet and minimize the spread in the breakdown voltage of the arrester.

The number of elements to be combined in an arrester is chosen according to the ratio $V_o/V_2$. When the ratio $V_o/V_2$ is smaller than 1.5 : 1, the overvoltages across the gaps 6 and 7 after the breakdown of the gap 12 will be relatively low. This may cause a delay in their breakdown and, as a consequence, impair the volt-second characteristic of the arrester. Therefore, in order to raise the overvoltage across the main gaps, it is necessary to increase the number of elements with stabilizing networks.

Figure 3:
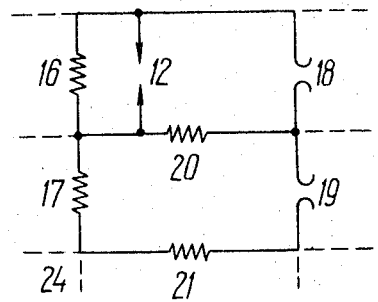
FIG. 3 is a circuit schematic diagram of an embodiment of firing means.

When the ratio $V_o/V_2$ is greater than 2 to 1, a small overvoltage will be applied to the gap 5 after the gaps 12, 6 and 7 have broken down. In this case, it will be good practice to modify the circuit of the element 1 as shown in FIG. 3.

Under normal operating conditions, the voltage across the resistors 16 and 17 is zero. The resistors 16 and 17 are approximately equal in value. After the gap 12 breaks down, the voltage across the gap 19 is doubled, after which the gaps 6 and 7 break down in the order described for the circuit of FIG. 1. After the gaps 6 and 7 break down, the overvoltage applied to the gap 18 will have an amplitude twice as great as that of the voltage across the gap 5 in the circuit of FIG. 1.

The main gaps should have ample thermal and dynamic stability so as to be able to pass short-circuit currents. The requirements for the breakdown voltage of these gaps are less stringent, namely: the maximum percent variance of the breakdown voltage should not exceed 20 percent, with allowance for weather conditions and wear of the electrodes after repeated breakdowns. Mechanically, they may be of exposed construction in the form of horn or ord gaps using substantial steel electrodes, or they may be enclosed, using a rotating arc.

What is claimed is:

1. A surge arrester, such as for power transmission lines, comprising, in combination, a main circuit formed by power gaps connected in series; an auxiliary circuit connected to said main circuit by way of resistors and including firing means made up of a parallel combination of a resistor and a spark gap, connected also in parallel with one of said power gaps; and stabilizing means connected in series with said firing means, wherein said stabilizing means uses symmetrical Zener diodes.

2. A surge arrester, such as for power transmission lines, comprising, in combination, a main circuit formed by power gaps connected in series; an auxiliary circuit connected to said main circuit by way of resistors and including firing means made up of a parallel combination of a resistor and a spark gap, connected also in parallel with one of said power gaps; and stabilizing means connected in series with said firing means, wherein said stabilizing means uses symmetrical avalanche diodes.

3. A surge arrester, such as for power transmission lines, comprising, in combination, a main circuit formed by power gaps connected in series; an auxiliary circuit connected to said main circuit by way of resistors and including a firing means made up of a parallel combination of a resistor and a spark gap, connected also in parallel with one of said power gaps; and stabilizing means connected in series with said firing means, wherein said stabilizing means uses unsymmetrical Zener diodes connected in opposition.

4. A surge arrester, such as for power transmission lines, comprising, in combination, a main circuit formed by power gaps connected in series; an auxiliary circuit connected to said main circuit by way of resistors and including a firing means made up of a parallel combination of a resistor and a spark gap, connected also in parallel with one of said power gaps; and stabilizing means connected in series with said firing means, wherein said stabilizing means uses unsymmetrical avalanche diodes connected in opposition.

* * * * *